US009654896B2

(12) United States Patent
Agrawal et al.

(10) Patent No.: US 9,654,896 B2
(45) Date of Patent: *May 16, 2017

(54) SMART ONLINE SERVICES PRESENCE IN A CELLULAR NETWORK

(75) Inventors: Dakshi Agrawal, Monsey, NY (US); Chatschik Bisdikian, Chappaqua, NY (US); Dinesh C. Verma, Mount Kisco, NY (US); Petros Zerfos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 614 days.

This patent is subject to a terminal disclaimer.

(21) Appl. No.: 13/240,186

(22) Filed: Sep. 22, 2011

(65) Prior Publication Data

US 2013/0078961 A1    Mar. 28, 2013

(51) Int. Cl.
   *H04W 4/00*   (2009.01)
(52) U.S. Cl.
   CPC ..................................... *H04W 4/00* (2013.01)
(58) Field of Classification Search
   CPC ... H04W 16/14; H04W 24/02; H04W 84/045; H04W 48/02; H04W 48/16; H04W 8/245;
   (Continued)

(56) References Cited

U.S. PATENT DOCUMENTS 7,309,015 B2   12/2007   Frantz et al.
7,870,106 B1    1/2011   Nguyen et al.
(Continued)

FOREIGN PATENT DOCUMENTS

CN    1765101 A    4/2006
CN    101060561 A   10/2007
(Continued)

OTHER PUBLICATIONS

A Technical Overview of Windows Media DRM 10 for Devices, Windows Media, Microsoft Corporation, XP-002371223, Sep. 2004, hereinafter D1.*

(Continued)

*Primary Examiner* — George Eng
*Assistant Examiner* — Jing Gao
(74) *Attorney, Agent, or Firm* — Scully, Scott, Murphy & Presser, P.C.; Jennifer R. Davis, Esq.

(57) ABSTRACT

A method and system for providing on-line services to a user from a services provider over a wireless cellular network. The cellular network is located between the user and the services provider, and a distributed computer system such as the Internet is located between the services provider and the cellular network for transmitting data between the services provide and the cellular network. In one embodiment, the services provider transmits software and operating characteristics over the distributed computer system to the cellular network, and the cellular network installs this software on one or more nodes of the network. When a user connects to the cellular network for services from the service provider, the network operates the software on the one or more nodes in accordance with the operating characteristics, to provide one or more services from this one or more nodes to the user from the service provider.

12 Claims, 3 Drawing Sheets

(58) Field of Classification Search
CPC ....... H04W 8/20; H04W 48/08; H04W 76/02; H04W 4/00; H04W 4/001; G06F 17/30902; G06F 21/00; G06F 21/35; G06F 8/61
USPC .............................. 455/414.1, 461; 726/1, 26
See application file for complete search history.

(56) References Cited

U.S. PATENT DOCUMENTS

| | | | |
|---|---|---|---|
| 8,239,507 | B2 | 8/2012 | Nakagawa et al. |
| 8,549,063 | B2 | 10/2013 | Nakagawa et al. |
| 8,701,102 | B2 | 4/2014 | Appiah et al. |
| 2005/0027887 | A1* | 2/2005 | Zimler ................ H04L 12/2814 709/249 |
| 2006/0011728 | A1* | 1/2006 | Frantz et al. ............ 235/462.46 |
| 2006/0021057 | A1 | 1/2006 | Risan et al. |
| 2007/0207818 | A1* | 9/2007 | Rosenberg et al. ........... 455/461 |
| 2009/0083404 | A1* | 3/2009 | Lenzmeier et al. .......... 709/221 |
| 2009/0300707 | A1* | 12/2009 | Garimella et al. ................ 726/1 |
| 2009/0313229 | A1 | 12/2009 | Fellenstein et al. |
| 2009/0320019 | A1 | 12/2009 | Ellington et al. |
| 2010/0177752 | A1 | 7/2010 | Aggarwal et al. |
| 2010/0199273 | A1 | 8/2010 | Rao |
| 2010/0229205 | A1* | 9/2010 | Hakusui ................ H04H 20/72 725/62 |
| 2011/0117896 | A1 | 5/2011 | Soelberg et al. |
| 2013/0031170 | A1 | 1/2013 | Pacella et al. |
| 2014/0317613 | A1 | 10/2014 | Appiah et al. |

FOREIGN PATENT DOCUMENTS

| | | |
|---|---|---|
| CN | 101800686 A | 8/2010 |
| JP | 2009-157768 A | 7/2009 |
| JP | 2010-532049 A | 9/2010 |

OTHER PUBLICATIONS

Office Action received in a related U.S. Patent Application, namely U.S. Appl. No. 13/606,131.

International Search Report dated Oct. 18, 2012 issued in PCT/CN2012/077826.

Office Action dated Jun. 4, 2015 received in a related U.S. Appl. No. 13/606,131.

Office Action, dated Jun. 10, 2016, received in U.S. Appl. No. 13/606,131.

* cited by examiner

SMART ONLINE SERVICES PRESENCE IN A CELLULAR NETWORK

BACKGROUND OF THE INVENTION

This invention generally relates to Internet, or on-line, services, and more specifically, to on-line services that are accessed through mobile wireless devices.

People are increasingly accessing Internet on-line services through their mobile wireless devices, such as smartphones. These services might include, for example financial services, gaming, auctions and shopping. As a result of this increased use of these mobile devices to access on-line services, the providers of these services have updated their offerings and infrastructure to accommodate their mobile customers better and to address unique characteristics and constraints of mobile wireless devices. For example, banks are providing custom applications that can be installed in mobile devices and that give custom interfaces that improve the quality of the user experience (QoE).

Typically, when a person uses a mobile wireless device to access an on-line Internet service, the person accesses the service via a cellular network, operated by a cellular company, or CelCo, having wireless access. The cellular network is between the user and the on-line service provider and the service provider is referred to as being on the other side of the cellular network from the user. Because the service provider is on this other side of the network, it may be very difficult for the service provider to optimize its operations to the dynamic behavior and needs of their customers. For example, it may be difficult for the service provider to respond quickly to the ever changing spatiotemporal context of the customers. This is because the CelCo networks that transport the user data serve as dumb bit pipes that carry data packets back and forth between the customers and the on-line service providers, and do not allow for any configuration of the quality of transmission or other operating characteristics by the service provider.

BRIEF SUMMARY

Embodiments of the invention provide a method and system for providing on-line services to a user from a service provider over a wireless cellular network. The cellular network is located in series between the user and the services provider, and a distributed computer system such as the Internet is located between the service provider and the cellular network for transmitting data between the service provide and the cellular network. In one embodiment, the service provider transmits software and operating characteristics over the distributed computer system to the cellular network, and the cellular network installs this software on one or more nodes of the cellular network. When a user connects to the cellular network for services from the service provider, the cellular network operates the software on said one or more nodes, in accordance with the operating characteristics, to provide one or more services from this one or more nodes to the user from the service provider.

In an embodiment, the cellular network includes and edge network for receiving or processing signals or data from the user, and the above-mentioned one or more nodes are in the edge network. In one embodiment this edge network includes a wireless transmitter/receiver base station for transmitting signals to and receiving signals from the user, or a gateway device for routing communications from the user to the distributed computing system.

In one embodiment the software is tested for compliance with specified requirements. In an embodiment, the operating characteristics identify specific software images to be executed to specific users at specific times and at specific locations. In one embodiment, the operating characteristics instruct activation of the software images at specified times and for specified durations. In an embodiment, the operating characteristics instruct the cellular network to deactivate and remove the software images at specified times.

In one embodiment, the cellular network tests the software images to determine whether these images comply with specified requirements of the cellular network. In an embodiment, the cellular network provisions the software images to operate within the cellular network and in the edge network. In an embodiment, the software images are loaded onto and distributed among a plurality of nodes in accordance with instructions from the service provider. The service provider is not required to supply the locations to which nodes the software images need to be sent out to. The service provider only needs to specify the spatial area of deployment, and the CelCo will make decisions in accordance to the desired locations.

Embodiments of the invention augment CelCo equipment with content processing functionality provided through software images supplied by on-line service providers which can be deployed to this functionality at will, for example, based on geography, time intervals, current spatiotemporal context of users, or outcome analytics processing.

In embodiments of the invention, certain key edge-of-the network nodes such as the base-station/gateway/controller are augmented (directly, or indirectly via an external box) to host and run software images that are supplied by on-line service providers and deployed by CelCos. The software images provided by the on-line service providers and their CelCo deployment policies may reflect, for example, the on-line service providers' needs, user context, and CelCo resource utilization strategies and availability.

In embodiments of the invention, the lifecycle of the software images—that is, the testing, compliance, conditioning, deployment and retrieval of these images—is managed by the on-line service provider's image lifecycle and distribution manager (ILDM) owned and run by the CelCo. The ILDM may also serve as a shield that isolates the internal CelCo equipment operations and characteristics from the process by which the on-line service providers supply their software images.

DETAILED DESCRIPTION

Figure 1:
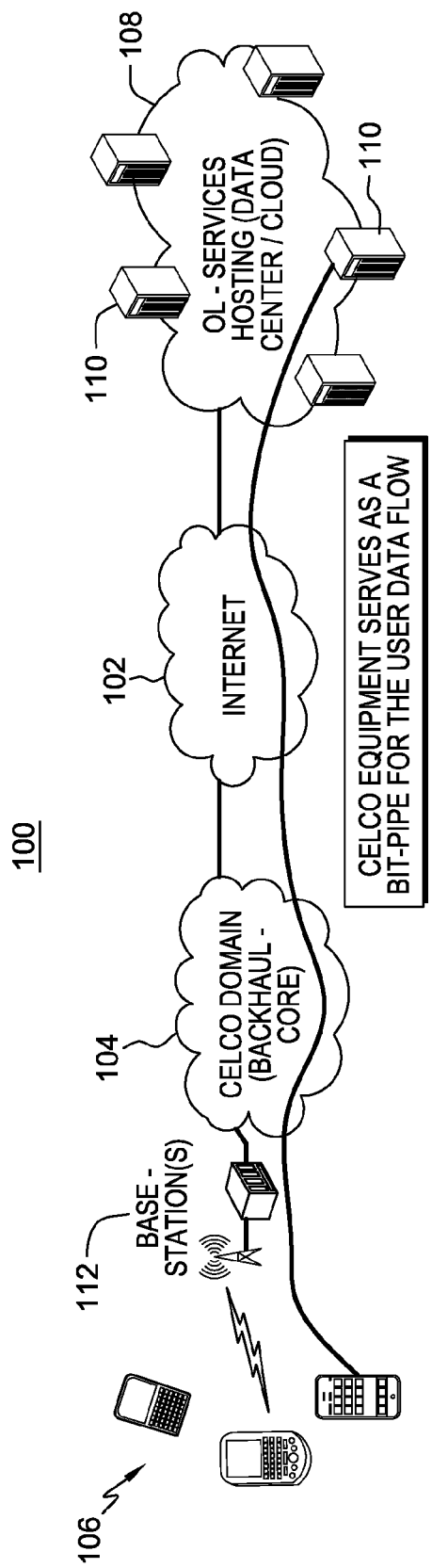
FIG. 1 shows a conventional procedure for accessing on-line services from mobile wireless devices.

FIG. 1 illustrates a conventional system 100 and method for accessing on-line services from mobile carrier devices via a distributed network such as the Internet and a wireless cellular network. These services, typically, are hosted on server systems, also referred to as "back end servers." In FIG. 1, the Internet is represented at 102, the cellular network is represented at 104, the mobile devices are represented at 106, the service providers are represented at 108 and the servers of the server systems are represented at 110.

These server systems may be in data centers or in a cloud computing environment. Cloud computing is a model of service delivery for enabling convenient, on-demand network access to a shared pool of configurable computing resources (e.g. networks, network bandwidth, services, processing, memory, storage application, virtual machines, and services) that can be rapidly provisioned and released with minimal management effort or interaction with a provider of the services.

The Internet is a worldwide collection of computer networks and gateways that use the TCP/IP suite of protocols to communicate with one another. At the core of the Internet is a backbone of high speed data communication lines between major nodes or host computers comprised of thousands of commercial, government, education, and other computer systems that route data and messages. The present invention, it may be noted, may be implemented with a number of different types of distributed networks, such as, for example, an intranet, a local area network (LAN) or a wide area network (WAN), and the invention may be used with other protocols besides TCP (e.g., UDP, RTP, IP-in-IP (tunneling) etc.). The Internet shown in FIG. 1 is intended as an example of a distributed network and not as a limitation of the present invention.

Cellular network 104 is a collection of cells that each includes at least one base station 112 capable of transmitting and relaying signals to subscriber's mobile devices. A "cell" generally denotes a distinct area of a cellular network that utilizes a particular frequency or range of frequencies for transmission of data. A typical base station is a tower to which are affixed a number of antennas that transmit and receive the data over the particular frequency or range of frequencies. Mobile devices 106, such as cellular or mobile phones, smart phones, camera phones, personal digital assistants (PDA's), tablets and laptop computers, may initiate or otherwise transmit a signal at the designated frequency to the base station in order to initiate a call or data session and begin transmitting data. It may be noted that a wide range of combinations of frequency, time and codes are possible and may be used on the practice of this invention, and the use of dedicated single-frequency carriers is not a requirement.

A backhaul network connects the base station to a gateway device. The backhaul network is the layer two (L2) network (from a mobile subscriber's perspective) that provides connectivity from the base station to the gateway device. Several cellular service providers are moving towards Internet Protocol (IP)/Multiprotocol Label Switching (MPLS) based mobile backhaul networks for Second Generation (2G), Third Generation (3G), and other wireless technologies. Microwave Access (WiMax) and Long Term Evolution (LTE) technologies are likely to move in this direction as well. For example, recently, cellular service providers have begun to upgrade cellular networks to support services, such as high-speed access to packet-based networks (e.g., the Internet), voice over Internet protocol (VoIP) and Internet protocol television (IPTV).

To upgrade the cellular networks, cellular service providers convert cellular signals, e.g., Time Division Multiple Access (TDMA) signals, Orthogonal Frequency-Division Multiplexing (OFDM) signals or Code Division Multiple Access (CDMA) signals, received at a base station from mobile devices into Internet protocol (IP) packets for transmission within the packet-based networks. A number of standards have been proposed to facilitate this conversion and transmission of cellular signals to IP packets, such as a General Packet Radio Service (GPRS) standardized by the Global System for Mobile Communications (GSM) Association, WiMax and LTE, as well as other standards.

Regardless of which standard a cellular service provider chooses to adopt, each of the standards generally define a cellular network architecture in which a particular mobile device is associated with a specific gateway device and an anchor device. Upon initiating a packet-based data communication session, the mobile device is bound to both a gateway device and an anchor device within the cellular network architecture. Commonly, each gateway device is an IP gateway or other IP-enabled access router that is associated with one or more base stations proximate to the origin of the communication session. In this way, the gateway devices make up the IP edge for the mobile subscribers. Through the transmission and relay capabilities of the base stations, each gateway device handles data session initiated by the mobile device and routes the IP communications to the packet-based networks. That is, the gateway device routes any data communication originated by the mobile device to the anchor device.

The anchor device is typically a service-oriented IP-enabled router that stores policies and other information (collectively, a "subscriber context") that are specific to a particular mobile device. The subscriber context may define, for example, a level or quality of service, encryption keys, address information, multicast group memberships, and charging and accounting information to account for the services provided to the particular mobile device. The anchor device provides an "anchor" or a set location for subscriber-specific context information (referred to as "subscriber contexts") required to access the packet-based network continuously while the associated mobile devices move through the cellular network. The anchor device may mark, tag, or otherwise process the data communication in accordance with the subscriber context and then route the data communication to the intended destination within the packet-based network. In some cellular architectures, the gateway device may be referred to as a "foreign agent" while the "anchor device" may be referred to as a "home agent."

The mobile devices 106 are representative of any appropriate type of device that include a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., mobile devices 106 may also be, as additional examples, tablet computers and single-purpose mobile devices (such as eBooks).

The mobile devices 106 are in wireless communication with the cellular network 104 through the cellular tower 112 in accordance with protocols as known by those skilled in the art. The cellular tower 112 has an antenna whose radio coverage is typically tuned to a specific geographic area. As will be understood by those skilled in the art, it should be noted that there need not necessarily be a one-to-one correspondence between cellular towers and geographic areas, in that multiple cellular towers may cover one area and one cellular tower may cover multiple areas.

As mentioned above, in FIG. 1, on-line service providers are represented at 108. Many specific types of on-line service providers that provide a wide range of specific services may be used in embodiments of the invention. The services provided by these providers may include, for example, financial services, gaming, auctions, shopping and many others. The service providers are connected to the Internet 102, or other distributed computer system, via one or more servers, represented at 110. Typically, the services are provided via one or more web sites hosted by one or more Web servers.

In accordance with embodiments of the present invention, the CelCo network 104 is augmented with content processing functionality provided through software images supplied by the on-line services providers and which can be deployed to this functionality at will. This deployment may be based on, for instance, geography, time intervals, the current spatiotemporal context of the users, or outcome analytics processing. In an embodiment of the invention, one or more hosting facilities are used by the CelCo to deploy and execute software provided by the on-line service providers. These hosting facilities can reside, for instance, at the edge of the CelCo network, co-located with CelCo nodes such as base stations, controllers, or others.

The term software image, as used herein, refers to (a binary imprint of) an executable piece of code that can be transported, installed, and executed as needed. The concept of a software image can be used to represent an object that contains all the necessary components that a software application, such as an on-line game application, an on-line e-tail application, such as shopping, etc., needs to run that can be deployed within a proper computing environment (a container) for execution. This object could be a virtual machine image, a web-application, a "war" (web archive) package, etc. The term software image may also refer to the software application contained within a software image, as described above, that is to be executed according to operational characteristics, as described herein.

Figure 2:
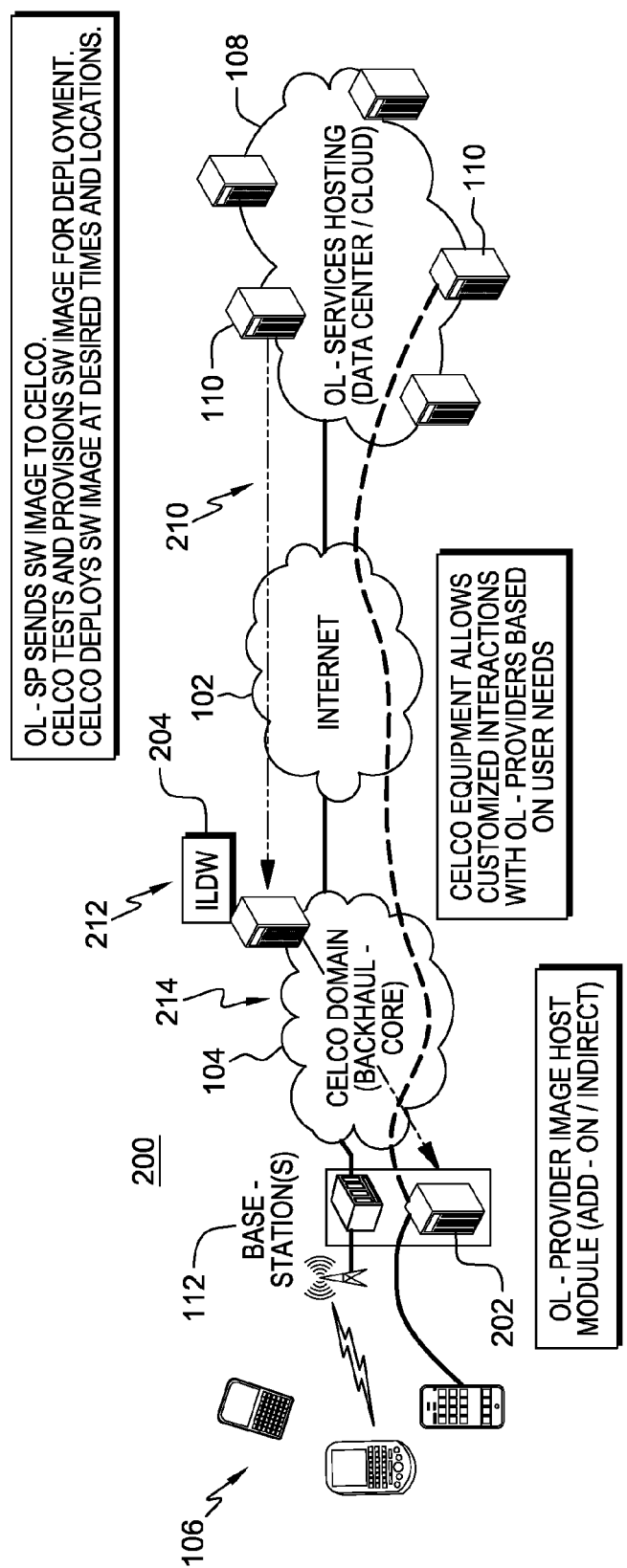
FIG. 2 illustrates a method and system for accessing on-line services in accordance with an embodiment of the invention.

FIG. 2 shows a system 200 for accessing on-line services in accordance with an embodiment of the invention. In this embodiment, certain key edge-of-the-network nodes such as the base-station/gateway/controller are augmented (directly, or indirectly via an external box, as shown at 202 in FIG. 2) to host and run software images that are supplied by the on-line services providers 108 and deployed by the CelCo network 104. These software images provided by the on-line services providers and their CelCo deployment policies may reflect the on-line services providers needs, user context, CelCo resource utilization strategies and availability, or other factors.

In embodiments of the invention, other nodes of the network may be used to host and run the software images supplied by the on-line services providers. In a cellular communication network, switching points and databases such as the base station controller, the home location register, the gateway GPRS, support node, and the serving GPRS support node are examples of nodes.

The lifecycle of the software images—that is, the testing, compliance, conditioning, deployment and retrieval of those images—is managed by the image lifecycle and distribution manager (ILDM) 204, owned and run by the CelCo. The ILDM also serves as a shield that isolates the internal CelCo equipment operational characteristics from the process by which the on-line service providers supply their software images.

Generally, in the operation of system 200, the on-line services provider sends software images to the cellular network, as represented at 210. As represented at 212, the cellular network operator tests and provisions these software images for deployment; and, as represented at 214, the cellular network deploys the software images at desired times and locations The process of testing includes verifying that the software in the image executes and, in general, behaves as was designed to execute in response to various stimuli that could be produced, for example, by the end-users (subscribers) interacting with the software through their cellphones, after the software image has been released in the network. The process of provisioning includes enabling the image to be deployed and the managed remotely, for example, associating with the software image supplemental information that is used to instruct the container, within which the software in the image is to be executed, when to deploy and un-deploy the software in the image, instruct the container the amount of resources, e.g., memory, to set-aside for it if any is required, provide authorization and authentication credentials to the image, so the container can safely accept the image, deploy, and execute the software in it, and so on.

Figure 3:
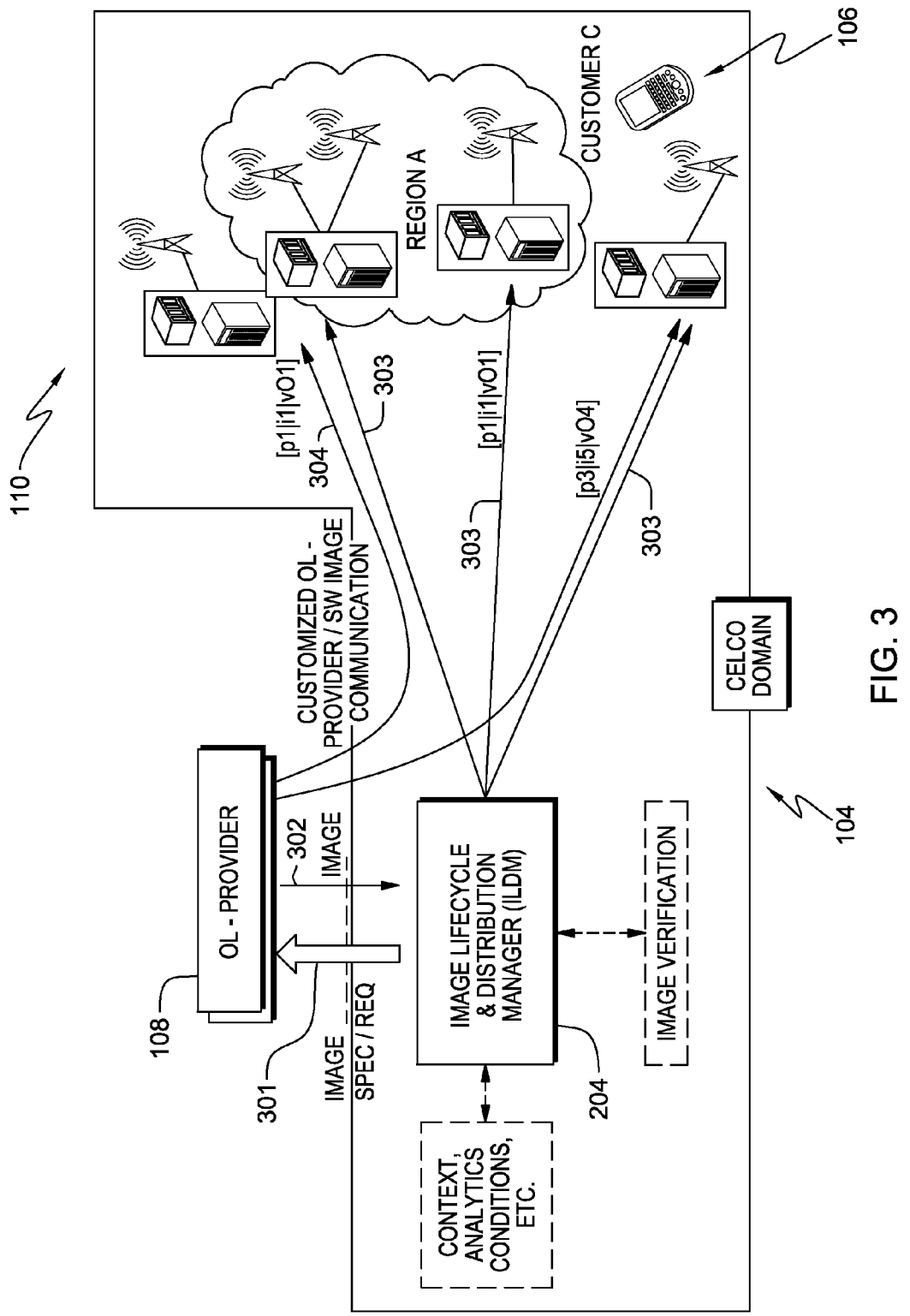
FIG. 3 depicts an example implementation of an embodiment of the invention.

FIG. 3 illustrates an implementation of an embodiment of the invention. At 301, the CelCo network 104 publishes requirements for how on-line services providers' software images are to be offered. These images may be offered in a number of ways; and for example, the images may be offered as a Web service to run in a Web-services container, or as a virtual machine (VM) images to run in a virtual machine container.

At 302, the on-line services providers provide images plus operational characteristics. These characteristics may be used to determine where to deploy and when to execute software in the software images to the user, based on, for example, the spatiotemporal context of the user, or other user related factors. For example, these operational characteristics may be that a particular version v01 of a particular image i1 from a provider p1 should run in region A in the evenings, while a version v04 of another image i5 from another provider p3 may run when customer C is involved during mornings.

At step 303, the ILDM distributes the software images to the edge of the wireless network, and the ILDM manages the images as necessary to support the on-line services provider's needs while also managing its own resources. For instance, the ILDM may check the images for compliance with predefined policies and requirements, and may check or monitor for deployment conditions such as user context, analytics results, provider requirements, time, geography, and others. The ILDM may also run software images for testing purposes in a pre-launch, restricted area. At step 304, the on-line services provider connects directly to its image at the edge of the wireless network over a tunneled link, allowing the services provider customized treatment of subscriber traffic.

As an example of an embodiment of the invention, a person would like to use his or her smart phone to play an interactive game. This user might want to play the game against the service providers' computers or against fellow players. Currently, when a player interacts with the game provider, the player basically engages with the points-of-presence (PoP) of the on-line game provider on the Internet. These PoP are located on the "other" side of the CelCo provider's network, for example in a data center or the "cloud" as shown in FIG. 1. The only thing the CelCo network does is to carry the bits and bytes of the gaming interactions from the smartphone to the gaming PoP. The extra time it takes for a player's bits and bytes to traverse the CelCo's network before they reach the Internet and then the gaming site negatively impacts the quality of experience (QoE) that the player has with the on-line gaming service.

In accordance with an embodiment of the invention, the on-line service provider has added a new special subscription plan that enhances the QoE of its customers by significantly decreasing the added latencies (say, to the time for the speed of light to travel from the player's smartphone to the CelCos antenna plus some extra processing time). Specifically, the on-line gaming provider has decided to take advantage of the new feature that the CelCo provider provides (see FIG. 2): The CelCo provides data processing capabilities at its "network edge" (the box 202 next to the antenna in FIG. 2) and leases "slices" of this capability to on-line service providers where their software images can be deployed and executed as necessary. The leases can be permanent, but also can be transient, e.g., for the next 2 hours, or every Tuesday between 10:00 pm and 12:00 pm. The CelCo can extract the IP packets destined to the on-line service provider (i.e., are addressing the on-line service provider's PoP in the Internet) from the packets coming from the player's smartphone and divert those to the on-line service providers' "local" slice. Any new IP packets that are generated containing the responses from the processing of the extracted packets are passed back the CelCo who then injects them back to the stream of transmission it sends to the smartphone.

The on-line game provider decides to lease (at least) one of these processing slices to be used to host and execute his gaming software, after a software image of it is deployed there by the CelCo. Hence, when the user interacts with the on-line service provider, the user interacts not with the service provider's PoP on the actual Internet, but with its presence at the edge of the CelCo network. If everything the user needs for his or her interaction with the game application can be accessed and processed locally, the user is served entirely from the local slice. If there is something missing, e.g., certain data required in responding to a user request, the software image in the slice can access the on-line service provider's facilities at the backend to retrieve them. Any interactions between the on-line service provider's software image and the provider's backend servers can be customized in their entirety to the liking of the on-line service provider. Such interactions can be carried over tunneled links between the provider's backend servers and the points of deployment of his software images; tunneled links are links that carry packets that are under the control of the on-line service provider. For example, for increased bandwidth efficiency, the on-line service provider may decide to concatenate several packets together before the service provider sends them to its own backend server.

Able to serve its users from the "edge," the on-line service provider can provide added services that are context dependent. For example, exploiting location awareness for the user, the on-line service provider may provide special deals for friends playing against each other located nearby (and share the same base station), may insert ads from local merchants in the game itself, customize the background of the game to look like the neighborhood that the players are in.

To effectively provide such a computing capability to on-line service providers, the CelCo uses the image lifecycle & distribution manager (ILDM) that on-line service providers interface with to send the software image they want installed at the edge of the network. The ILDM may test the image to see that it works properly, it does not contain viruses, it does not interfere with the operation of other software images, etc. The CelCo may advertise any requirement that the software images must possess to be allowed to run in an on-line service provider image host module (as discussed above in connection with step 301 of FIG. 3). Based on on-line service provider desires and operational conditions, e.g., the number of deployed sortware images from various on-line service providers, congestion levels, time of day, etc., the ILDM dispatches software images to the various on-line service provider image hosting modules it has available—as discussed above in connection with steps 302 and 303 of FIG. 3.

As will be readily apparent to those skilled in the art, aspects of the present invention can be realized in hardware, software, or a combination of hardware and software. Any kind of computer/server system(s)—or other apparatus adapted for carrying out steps or features described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

Aspects of the present invention can also be embodied in a computer program product, which comprises features enabling the implementation of tasks or steps described herein, and which—when loaded in a computer system—is able to carry out these tasks for steps. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to achieve the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A system for providing on-line services to a user from a service provider over a wireless cellular telephone network, the system comprising:
   the wireless cellular telephone network located in series between the user and the service provider, and including a multitude of communications nodes, one or more of said nodes including a hosting facility to host and run software images supplied by the service provider and deployed by the wireless cellular telephone network; and
   a distributed computer system located between the service provider and the wireless cellular telephone network for transmitting data between the service provider and the wireless cellular telephone network;
   the wireless cellular telephone network comprising one or more processing units configured for:
   operating a manager of the wireless cellular telephone network for receiving the software images and operating characteristics over the distributed computer system from the service provider, for installing said software images in a container on said hosting facility of said one or more nodes of the wireless cellular telephone network to give the service provider a presence in the wireless cellular telephone network, for providing information to instruct the container when to deploy and un-deploy the software images, instruct the container on amount of resources to set aside for the container, and provide authorization and authentication credentials to the software images, and for managing the software images on the hosting facility to support the service provider; and when a user connects to the wireless cellular telephone network for services from the service provider, operating said software images on said hosting facility of the wireless cellular telephone network in accordance with said operating characteristics, to provide one or more services of the service provider to the user from said hosting facility of the wireless cellular telephone network, including when the user sends to the wireless cellular telephone network data packets addressed to the service provider, the wireless cellular telephone network extracting the data packets sent from the user and addressed to the service provider and diverting the extracted data packets in the wireless cellular telephone network to the hosting facility for the service provider in the wireless cellular telephone network, wherein data processing capabilities provided to the service provider at said hosting facility of the wireless cellular telephone network are available to the user, and the user interacts with the service provider's presence on the wireless cellular telephone network.

2. The system according to claim 1, wherein:
the wireless cellular network includes an edge network for receiving or processing signals or data from the user, and said one or more nodes are in the edge network; and
said edge network includes a wireless transmitter/receiver base station for transmitting signals to and receiving signals from the user, and a gateway device for routing communications from the user to the distributed computing system.

3. The system according to claim 1, wherein the installing includes testing the software images for compliance with specified requirements.

4. The system according to claim 1, wherein:
the operating characteristic identify specific portions of the software images for be executed for specific users at specific times and at specific locations; and
the operating characteristics instruct activation of the software images at specified times and for specified durations, and the operating characteristics instruct the wireless cellular telephone network to deactivate and remove the software images at specified times.

5. The system according to claim 1, wherein the installing the software images on the one or more nodes includes:
testing the software images to determine whether said software images comply with specified requirements of the wireless cellular telephone network; and
provisioning the software images to operate within the wireless cellular telephone network and in said one or more nodes.

6. The system according to claim 1, wherein:
the service provider has an internet address;
said packets addressed to the service provider are addressing the service provider's point of presence on the internet;
the wireless cellular telephone network diverting the extracted data packets includes the wireless cellular telephone network diverting the extracted data packet to said one more nodes; and
new packets containing responses from a processing of the extracted packets are passed to the wireless cellular telephone network, and the wireless cellular telephone network injects the new packets back to a stream of transmission the wireless cellular telephone network sends to a mobile communication device of the user.

7. The method according to claim 1, wherein the managing the software images on the hosting facility to support the service provider includes monitoring for deployment conditions including user context, analytics results, provider requirements, time and geography.

8. An article of manufacture comprising:
at least one non-transitory computer readable hardware medium having computer readable program code logic to provide on-line services to a user from a service provider over a wireless cellular telephone network, wherein the wireless cellular telephone network is located in series between the user and the service provider, the wireless cellular telephone network including a multitude of communications nodes, one or more of said nodes including a hosting facility to host and run software images supplied by the service provider and deployed by the wireless cellular telephone network, and a distributed computer system is located between the service provider and the wireless cellular telephone network for transmitting data between the service provide and the wireless cellular telephone network, the computer readable program code logic, when executing, performing following:
operating a manager of the wireless cellular telephone network for receiving the software images and operating characteristics over the distributed computer system from the service provider, for installing said software images in a container on said hosting facility of said one or more nodes of the wireless cellular telephone network to give the service provider a presence in the wireless cellular telephone network, for providing information to instruct the container when to deploy and un-deploy the software images, instruct the container on amount of resources to set aside for the container, and provide authorization and authentication credentials to the software images, and for managing the software images on the hosting facility to support the service provider; and
when a user connects to the wireless cellular telephone network for services from the service provider, operating said software images on said hosting facility of said one or more nodes of the wireless cellular telephone network, in accordance with said operating characteristics, to provide one or more services of the service provider to the user from said hosting facility of the wireless cellular telephone network, including when the user sends to the wireless cellular telephone network data packets addressed to the service provider, the wireless cellular telephone network extracting the data packets sent from the user and addressed to the service provider and diverting the extracted data packets in the wireless cellular telephone network to the hosting facility for the service provider in the wireless cellular telephone network, wherein data processing capabilities provided to the service provider at said one or more nodes of the wireless cellular telephone network are available to the user, and the user interacts with the service provider's presence on the wireless cellular telephone network.

9. The article of manufacture according to claim 8, wherein:
the wireless cellular telephone network includes an edge network for receiving or processing signals or data from the user, and said on or more nodes are in the edge network; and said edge network includes a wireless transmitter/receiver base station for transmitting signals to and receiving signals from the user, and a gateway device for routing communications from the user to the distributed computing system.

10. The article of manufacture according to claim 9, wherein the installing includes testing the software images for compliance with specified requirements.

11. The article of manufacture according to claim 8, wherein:
- the operating characteristic identify specific software images to be executed for specific users at specific times and at specific locations; and
- the operating characteristics instruct activation of the software images at specified times and for specified durations, and the operating characteristics instruct the wireless cellular telephone network to deactivate and remove the software images at specified times.

12. The article of manufacture according to claim 8, wherein the installing the software images includes:
- testing the software images to determine whether said software images comply with specified requirements of the wireless cellular telephone network; and
- provisioning the software images to operate within the wireless cellular telephone network and in said on or more nodes.

* * * * *